(12) United States Patent
Philipp

(10) Patent No.: US 9,430,104 B2
(45) Date of Patent: *Aug. 30, 2016

(54) TOUCH SCREEN ELEMENT

(71) Applicant: Atmel Corporation, San Jose, CA (US)

(72) Inventor: Harald Philipp, Zug (CH)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,619

(22) Filed: Feb. 10, 2014

(65) Prior Publication Data

US 2014/0152919 A1 Jun. 5, 2014

Related U.S. Application Data

(63) Continuation of application No. 12/830,163, filed on Jul. 2, 2010, now Pat. No. 8,648,819, which is a continuation of application No. 11/743,349, filed on May 2, 2007, now abandoned.

(60) Provisional application No. 60/746,555, filed on May 5, 2006.

(51) Int. Cl.
*G06F 3/044* (2006.01)
*G06F 3/045* (2006.01)

(52) U.S. Cl.
CPC ............... *G06F 3/044* (2013.01); *G06F 3/045* (2013.01)

(58) Field of Classification Search
CPC .................................. G06F 3/044; G09G 5/00
USPC ................................................. 345/156–175
See application file for complete search history.

(56) References Cited

U.S. PATENT DOCUMENTS 3,806,912 A 4/1974 Eckert et al.
4,087,625 A * 5/1978 Dym ....................... G06F 3/044
                                                                    178/18.06

(Continued)

FOREIGN PATENT DOCUMENTS

EP   1192585 A1   4/2002
GB    154617 A   11/1977

(Continued)

OTHER PUBLICATIONS

Official Communication from German Patent Office regarding Appln. 10 2007 021 029.0 dated Aug. 4, 2011 (with English translation).

(Continued)

*Primary Examiner* — Grant Sitta
(74) *Attorney, Agent, or Firm* — Fish & Richardson P.C.

(57) ABSTRACT

A capacitive two-dimensional (2D) touch panel has three sets of interleaved electrodes. A first set of electrodes is spaced apart along the y-direction and these are galvanically connected to each other by a resistive strip connected at either end to a connection line. A second set of electrodes is also arrayed along the y-direction and these are galvanically connected to each other via a notionally non-resistive first connection. A third set of electrodes is also arrayed along the y-direction and these are galvanically connected to each other via a notionally non-resistive second connection. The second and third sets of electrodes are interleaved without galvanic cross-conduction to provide a gradient along the x-direction to resolve touch position in the x-direction. The first set of electrodes resolves touch position along the y-direction. Passive or active capacitive sensing techniques may be used to acquire the position information from the 2D touch panel.

25 Claims, 8 Drawing Sheets

(56) References Cited

U.S. PATENT DOCUMENTS

| | | | |
|---|---|---|---|
| 4,198,539 A | | 4/1980 | Pepper, Jr. |
| 4,550,221 A | | 10/1985 | Mabusth |
| 4,587,378 A | * | 5/1986 | Moore ............... G06F 3/045 345/173 |
| 4,659,874 A | | 4/1987 | Landmeier |
| 4,705,919 A | | 11/1987 | Dhawan |
| 4,952,757 A | | 8/1990 | Purcell |
| 4,999,462 A | | 3/1991 | Purcell |
| 5,053,715 A | * | 10/1991 | Andermo ............ G01B 7/003 324/660 |
| 5,648,642 A | | 7/1997 | Miller et al. |
| 5,650,597 A | | 7/1997 | Redmayne |
| 5,730,165 A | | 3/1998 | Philipp |
| 5,777,604 A | * | 7/1998 | Okajima ............. G06F 3/045 178/20.03 |
| 5,844,506 A | | 12/1998 | Binstead |
| 5,940,065 A | | 8/1999 | Babb et al. |
| 6,222,522 B1 | | 4/2001 | Matthews et al. |
| 6,246,394 B1 | * | 6/2001 | Kalthoff ............. G06F 3/045 178/18.01 |
| 6,288,707 B1 | * | 9/2001 | Philipp ..................... 345/168 |
| 6,297,811 B1 | * | 10/2001 | Kent et al. .................. 345/173 |
| 6,452,514 B1 | | 9/2002 | Philipp |
| 6,466,036 B1 | | 10/2002 | Philipp |
| 6,506,983 B1 | | 1/2003 | Babb et al. |
| 6,535,200 B2 | | 3/2003 | Philipp |
| 7,148,704 B2 | | 12/2006 | Philipp |
| 7,663,607 B2 | | 2/2010 | Hotelling |
| 7,800,586 B2 | * | 9/2010 | Serban et al. ................ 345/168 |
| 7,875,814 B2 | | 1/2011 | Chen |
| 7,920,129 B2 | | 4/2011 | Hotelling |
| 8,031,094 B2 | | 10/2011 | Hotelling |
| 8,031,174 B2 | | 10/2011 | Hamblin |
| 8,040,326 B2 | | 10/2011 | Hotelling |
| 8,049,732 B2 | | 11/2011 | Hotelling |
| 8,179,381 B2 | | 5/2012 | Frey |
| 8,648,819 B2 | * | 2/2014 | Philipp ................. G06F 3/044 345/156 |
| 2003/0098698 A1 | * | 5/2003 | Bengtsson ................. 324/644 |
| 2003/0132922 A1 | | 7/2003 | Philipp |
| 2004/0104826 A1 | * | 6/2004 | Philipp .................. 341/34 |
| 2005/0041018 A1 | | 2/2005 | Philipp |
| 2007/0132737 A1 | * | 6/2007 | Mulligan et al. ............. 345/173 |
| 2007/0247443 A1 | | 10/2007 | Philipp |
| 2007/0257894 A1 | | 11/2007 | Philipp |
| 2009/0315854 A1 | | 12/2009 | Matsuo |
| 2010/0271330 A1 | | 10/2010 | Philipp |
| 2012/0242588 A1 | | 9/2012 | Myers |
| 2012/0242592 A1 | | 9/2012 | Rothkopf |
| 2012/0243151 A1 | | 9/2012 | Lynch |
| 2012/0243719 A1 | | 9/2012 | Franklin |
| 2013/0076612 A1 | | 3/2013 | Myers |

FOREIGN PATENT DOCUMENTS

| | | |
|---|---|---|
| GB | 1546317 A | 11/1977 |
| GB | 2428306 | 1/2007 |
| TW | 2005/020056 | 9/2005 |
| TW | 200529052 A | 9/2005 |
| WO | WO-9805025 A1 | 2/1998 |
| WO | WO-0073984 A1 | 12/2000 |
| WO | WO 2012/129247 | 9/2012 |

OTHER PUBLICATIONS

Official Communication to the German Patent Office regarding Appln. 10 2007 021 029.0 dated Feb. 10, 2010 (with English translation of the claims).
Philipp, U.S. Appl. No. 12/830,163, Issue Fee Notification, Jan. 22, 2014.
Harald Philipp, patent application filed May 2, 2007, U.S. Appl. No. 11/743,349, 40 pages.
Harold Philipp, U.S. Appl. No. 11/743,349 Non-Final Office Action dated Apr. 2, 2010, 18 pages.
Harold Philipp, U.S. Appl. No. 11/743,349 Abandonment Notice dated Oct. 14, 2010, 2 pages.
Harold Philipp, continuation patent application filed Jul. 2, 2010, U.S. Appl. No. 12/830,163, 34 pages.
Harold Philipp, U.S. Appl. No. 12/830,163 Non-Final Office Action dated Jul. 12, 2011, 16 pages.
Harold Philipp, U.S. Appl. No. 12/830,163 Response to Non-Final Office Action filed Nov. 14, 2011, 7 pages.
Harold Philipp, U.S. Appl. No. 12/830,163 Final Office Action dated Jan. 25, 2012, 17 pages.
Harold Philipp, U.S. Appl. No. 12/830,163 RCE Response and Amendment Final Office Action filed Apr. 25, 2012, 11 pages.
Harold Philipp, U.S. Appl. No. 12/830,163 Non-Final Office Action dated Aug. 13, 2013, 19 pages.
Harold Philipp, U.S. Appl. No. 12/830,163 Response to Non-Final Office Action filed Nov. 13, 2013, 10 pages.
Harold Philipp, U.S. Appl. No. 12/830,163 Notice of Allowance and Issue Fee(s) Due dated Nov. 22, 2013, 11 pages.
Harold Philipp, U.S. Appl. No. 12/830,163 Comment on Statement of Reasons for Allowance filed Dec. 31, 2013, 1 page.
U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.
U.S. Appl. No. 11/743,349, Non-Final Office Action, 10 pages, Mailed Apr. 2, 2010.
German Application No. 102007021029.0, Office Action (with English Translation), 2 pages, Mailed Oct. 27, 2009.
UK Intellectual Property Office, Search Report in GB0708359.5, Mailed Aug. 17, 2007.
Office Action of the Intellectual Property Office of Taiwan regarding Patent Application No. 096115411, (foreign and English versions), communication issued Apr. 8, 2013.

* cited by examiner

TOUCH SCREEN ELEMENT

RELATED APPLICATIONS

This application is a continuation, under 35 U.S.C. §120, of U.S. patent application Ser. No. 12/830,163, filed Jul. 2, 2010, which is a continuation, under 35 U.S.C. §120, of U.S. patent application Ser. No. 11/743, 349, filed May 2, 2007, which claims the benefit, under 35 U.S.C. §119(e), of U.S. Provisional Patent Application Ser. No. 60/746,555, filed on May 5, 2006, which are incorporated herein by reference in their entirety.

BACKGROUND OF THE INVENTION

The invention pertains to 2-dimensional touch sensing surfaces operable by a human finger, or a stylus. Example devices include touch screens and touch pads, particularly those over LCDs, CRTs and other types of displays, or pen-input tablets, or encoders used in machinery for feedback control purposes. In particular this invention pertains to 2-dimensional capacitive touch sensing surfaces constructed so that the sensing layer is disposed on the rear of a panel or lens surface, particularly for use in smaller touch screens where there is a space constraint along the edges of the screen, for example in portable devices such as mobile phones or hand-held media players. In addition the invention addresses the need to reduce the effects of capacitive 'hand shadow'.

In my earlier U.S. application Ser. No. 10/916,759 (published as US2005/0041018A), there is a pattern of galvanically coupled conductors which have anisotropic galvanic properties within the sensing region, due to the use of conductive stripes which prevent current flows in more than one direction, or possibly through the use of a special unpatterned anisotropic conductive material. At least four connections are made, one at each of the corners of the sensing layer to a capacitive sensing circuit which detects the signals associated with finger touch. A processor mathematically computes the centroid location of touch within the area using ratiometric methods. A simple quadratic equation or other method corrects for pin-cushion distortion that appears on only two sides of the sensing region.

In my U.S. provisional application 60/745,583 and co-pending U.S. patent application Ser. No. 11/734,813 derived therefrom (not yet published), there is described a hybrid pattern of electrodes, galvanically connected along a first axis and galvanically isolated along a second axis, which have a resistively derived field distribution on the one axis and a capacitively derived field distribution on the second axis. There are a plurality of connections with a resistive conductive path between them on each of two sides of the touch area, for a total of at least four sensing circuit connections to the device. An improvement comprises the use of more than two connections along each resistive path in order to reduce the effects of capacitive hand shadow and to improve spatial resolution along the axis of the resistive elements. There is no inherent distortion in the electrical response of the sensing area which might require mathematical correction. A first ratiometric computation is used to compute position on one axis and a second ratiometric computation to derive touch position on the second axis.

The term 'two-dimensional capacitive transducer' or '2DCT' will be used throughout to refer to touch screens, touch sensing pads, proximity sensing areas, display overlay touch screens over LCD, plasma, or CRT screens or the like, position sensing for mechanical devices or feedback systems, or other types of control surfaces without limitation, having a surface or volume capable of reporting at least a 2-dimensional coordinate, Cartesian or otherwise, related to the location of an object or human body part, by means of a capacitance sensing mechanism.

The term 'two-dimensional resistive transducer' or '2DRT' refers to touch screens or pen input devices based on purely galvanic principles, and known in the industry generically as 'resistive touch screens'. The term '2DxT' refers to elements of either the 2DCT or 2DRT type.

The term 'touch' throughout means touch or proximity by a human body part or mechanical component of sufficient capacitive signal strength to generate a desired output. In the sense of 'proximity', touch can also mean to 'point' at a 2DCT without making physical contact, where the 2DCT responds to the capacitance from the proximity of the object sufficient to react with a desired effect.

Unless otherwise noted, the term 'electrode' refers to a capacitive field-emitting sensing structure or element within the active region of the sensing surface. The term 'connection' refers to galvanic contact between the sensing electrodes and the sensing circuitry. The terms 'object' and 'finger' are used synonymously in reference to either an inanimate object such as a wiper or pointer or stylus, or alternatively a human finger or other appendage, any of whose presence adjacent the element will create a localized capacitive coupling from a region of the element back to a circuit reference via any circuitous path, whether galvanically or non-galvanically. 'Dielectric' means any substantially non-conducting material such as plastic, glass, mineral, wood or other substances, particularly in reference to a layer interposed between the electrodes and the object such as a cover panel or film or lens. The term 'touch' means any capacitive or galvanic coupling between an object and the electrodes and includes either direct physical contact between an object and the sensing electrodes, or physical contact between object and a dielectric existing between object and the sensing electrodes, or, non-contact coupling to the sensing electrodes which may or may not include an intervening layer of dielectric between the object and the electrodes. The mention of specific circuit parameters, or orientation is not to be taken as limiting to the invention, as a wide range of parameters is possible using no or slight changes to the circuitry or algorithms; specific parameters and orientation are mentioned only for explanatory purposes.

Many types of 2DCT are known to suffer from a geometric distortion known as 'pin-cushion' whereby the reported coordinate of touch is in error due to electrical effects on the sensing surface. These effects are described in more depth in various other patents for example in Pepper U.S. Pat. No. 4,198,539. An excellent summary of the known causes, solutions, and problems of the solutions to geometric distortion can be found in a reading of Babb et al, in U.S. Pat. Nos. 5,940,065 and 6,506,983. U.S. Pat. No. 5,940,065 describes succinctly the two major classes of correction: 1) electromechanical methods involving design of or modification to the sensing electrode(s) or its connections; 2) the use of mathematical formulae to correct the distortion.

Touch screen designs exist which use structured sensing electrodes to suppress distortion at the expense of complexity of the sensing element and drive electronics. One example is U.S. Pat. No. 5,844,506 (Binstead) which discloses fine wire electrodes in an x-y arrangement. Another is U.S. Pat. No. 5,650,597 (Redmayne) which discloses an array of unidirectional bars with multiplexed connections. U.S. Pat. No. 6,297, 811 (Kent et al.) describes the use of triangular outline shapes each connected to an individual sensing channel. U.S. Pat. No. 4,550,221 (Mabusth) is an example of a matrix approach where x and y oriented electrodes must cross each other, forcing the electrode structure to occupy two or more layers which adds considerable expense and in the case of LCD touch screens reduces transparency. Co-pending U.S. Provisional Application 60/697,613 (published as GB2428306) further describes a method for structuring electrodes which avoid crossovers in the sensing region with little or no distortion, but this method still requires a relatively large number of connections. These methods can all provide good resolution but require a large number of connections and are therefore costly to implement. Also, a high connection count limits utility in smaller touch screens were there is little space surrounding the sensing area to permit large numbers of wiring traces to the connections.

2DCT devices which employ matrix or electrode-to-electrode coupling approaches such as U.S. Pat. No. 4,198,539 (Pepper) or U.S. Pat. No. 5,650,597 (Redmayne) also have a limited ability to project fields through thick materials, or to project their fields slightly into free space to create a 'point screen'. In the case of U.S. Pat. No. 4,198,539 (Pepper) the individual electrodes are very narrow and as a result have limited surface area which is essential to project a field through a thicker dielectric; as a result, such designs are typically limited in application to track pads for notebook computers and the like, with a thin overlay on top of electrodes. In the case of U.S. Pat. No. 5,650,597 (Redmayne) the fields are closed between adjacent electrode stripes, restricting the field lines to a short path with little field remaining to emerge from the dielectric. Such limitations reduce touch signal strength and prevent the use of the electrodes with thick dielectric layers.

2DCT devices which employ electrodes which are reliant on the resistance of the electrodes, such as my co-pending U.S. application Ser. No. 10/916,759 (published as US2005/0041018A) or U.S. Pat. Nos. 4,198,539 and 5,650,597 are subject to nonlinearities or unit-to-unit inconsistencies which require a calibration process to correct. Such a calibration process adds to the cost of the sensing element and can easily fall out of calibration with time and environmental conditions, such as temperature or humidity or exposure to light, which over time can alter the resistance of the electrodes. The need for recalibration of the sensing element is a serious commercial disadvantage.

It should be noted that the electronic sensing circuitry and methods described in my prior patents and patent applications, i.e. U.S. Pat. Nos. 5,730,165, 6,288,707, 6,466,036, 6,535,200, 6,452,514, and co-pending applications U.S. Ser. No. 10/697,133 (published as US 2004/104826A1 and granted as U.S. Pat. No. 7,148,704) and U.S. Ser. No. 10/916, 759 (published as US2005/0041018A) can be used in conjunction with the invention described herein, but, these circuits and methods are not to be construed as limiting. A variety of capacitive sensing circuits and interpretive logic can be used with the invention, to drive the electrodes and to generate the required outputs.

In my co-pending U.S. application Ser. No. 10/697,133 (published as US 2004/104826A1 and granted as U.S. Pat. No. 7,148,704), there is described in conjunction with FIG. 12 a method of using individual resistive 1D stripes to create a touch screen. These stripes can be read either in parallel or sequentially, since the connections to these stripes are independent of one another. Furthermore, in connection with FIG. 6 there is described an interpolated coupling between adjacent elements and an object such as a finger. U.S. Ser. No. 10/697,133 (published as US 2004/104826A1 and granted as U.S. Pat. No. 7,148,704) is incorporated herein by reference.

The present invention is similar to my U.S. Pat. No. 6,288, 707 FIG. 4. In this configuration there are interleaved triangular electrodes which resolve position on a first axis, and graduated bar electrodes which resolve position on a second axis. In U.S. Pat. No. 6,288,707 the triangles are wired in two opposing sets, and connected to one sensing channel per set. The rectangular bars are also wired in two sets, with the width ratio of the bars varying as a percentage of a fixed total height along a second axis. Four connections are required for this configuration.

The use of triangular shaped electrodes to create field gradients has been known for some time; for example, U.S. Pat. No. 4,087,625 (Dym et al.) which is a pen input device uses repeating sets of triangular electrodes 14a, 14b to generate capacitive fields. Resistor dividers 27, 32 generate a field gradient on one axis while the triangles generate a gradient on a second axis. This disclosure does not teach the use of a capacitive sensing function in the electrode array itself, relying instead on a pen to pick up the fields. The device cannot therefore detect a human touch.

U.S. Pat. No. 4,659,874 (Landmeier) discloses a pen input device having similar triangular pattern sets which change dimension along one axis. The x dimension is resolved by the field gradient produced by the triangular shapes while the y dimension is resolved by changing the base width of the triangles along the y axis. The invention requires the use of an active pen to inject signals into the sensing array and is not responsive to human touch. One disadvantage of the y axis field gradient produced by this design is that the gain along the vertical axis is insufficient to provide full scale readings, thus requiring the output to be resealed accordingly. Also it is quite difficult to prevent the response from being granular as the patterns can be quite large to accomplish the desired gradient effect on the y axis.

U.S. Pat. No. 4,999,462 (Purcell) discloses a method using triangles, again with a pen input device and wiring from a microcomputer to each individual triangle wherein the pen picks up the electric field from the triangular electrodes. This system is also incapable of detecting human touch.

U.S. Pat. No. 4,705,919 (Dhawan) and U.S. Pat. No. 4,952, 757 (Purcell) disclose further pen input devices using triangles.

SUMMARY OF THE INVENTION

The present invention is a capacitive 2D pen-less sensing element using three distinct sets of interleaved electrodes. A first set of electrodes along a first (y) axis are galvanically connected to each other via a deliberately resistive strip; a second set of electrodes arrayed along said first axis are galvanically connected to each other via a notionally non-resistive first connection along a first side of the first axis; a third set of electrodes along said first axis are galvanically connected to each other via a notionally non-resistive second connection along a second side of the first axis. The second and third set of electrodes are interleaved without galvanic cross-conduction to provide a gradient along a second (x) axis to resolve touch position thereon. The first set of electrodes resolves touch position along the first (y) axis.

In some embodiments, the electrodes are connected to capacitance measuring means having at least four sensing channels with phase-synchronous sampling on all four channels. The number of sensing channels can be reduced to a minimum of two in other embodiments in which active sensing is used, with phase-synchronous sampling taking place on the at least two channels.

The capacitive touch screen of the invention is particularly useful for applications where size of the touch screen is important i.e. small touch screens and mouse track pads for example.

The present invention in one aspect provides a pen-less 2DCT for detecting touch or proximity, comprising: a first electrode set composed of a plurality of bars arranged substantially in a parallel array along a first axis, the electrodes being connected to each other via intentionally resistive galvanic paths, and having a first connection on a first bar and a second connection on a second bar, the first and second bars being end bars of the set; a second electrode set composed of a plurality of gradient field generating shapes arranged substantially in a parallel array along the first axis, the second set being galvanically connected to each other and having one connection for the set; a third electrode set composed of a plurality of gradient field generating shapes arranged substantially in a parallel array along the first axis, the third set being galvanically connected to each other and having one connection for the set; wherein the second and third electrode sets resolve position of touch along a second axis when their capacitances are ratiometrically analyzed, and wherein the first electrode set resolves position along the first axis when the capacitive measurements from at least two points along the set are analyzed.

The additional connection may be made to the first electrode set at a point between the first and second connections. There may be a plurality of such additional connections.

In some embodiments, said connections may be wired to channels of capacitive sensing means, said means operating all connections in phase-synchronous manner. The capacitive sensing means may comprise charge-transfer sensing circuits which are switched substantially in unison.

The dimensions of the repeating pattern of bars and triangles are preferably scaled to be equal to or smaller than that of a human finger touch.

It is one object of the invention to eliminate response distortion in the sensing surface by using structured electrodes.

Another object of the invention is to reduce the connection count associated with structured electrodes in order to enable the invention to be used in small form-factor displays having limited space surrounding the sensing surface by having a reduced number of wiring traces to the drive electronics.

Another object of the invention is to reduce the reliance of the sensing surface on the resistance of the electrode material, especially in the case of clear sensing electrodes.

Another object of the invention is to provide an auto calibration function so that the need for factory or field calibration is reduced or eliminated.

Another object of the invention is to provide the electrodes on a rear surface of a dielectric panel with sufficient signal strength to accurately resolve location due to touch.

Another object of the invention is to use only a single layer of electrodes with no crossovers in the active sensing region, to reduce cost and improve transparency in the case of clear touch screen applications.

Another object of the invention is to provide compatible with clear conductive materials such as Indium Tin Oxide (ITO), Antimony Tin Oxide, (ATO), Flourine Tin Oxide (FTO), carbon nanotube (CNT) based films and the like, or conductive polymers such as Agfa Orgacon™ (hereinafter all such clear conductive materials will be referred to as 'ITO' for convenience).

Another object of the invention is to provide for a driver circuit having low average power, for example by the use of sleep modes where the device samples slowly or not at all and mostly sleeps, and a wake function whereby when touched the device speeds up to provide appropriate speed of response.

Another object of the invention is to provide for proximity detection, so that the sensing surface can be made to react to non-touch, for example to provide a wakeup function for the product it is interfaced to, to bring it out of a low-power sleep state.

Another object of the invention is to provide for a simple drive circuit having a very low component count and driven by intelligent logic such as a microcontroller.

Another object of the invention is to provide for electrodes which do not produce appreciable localized nonlinearity in response to a touch.

Another object of the invention is to provide for a sensing element and circuit with reduced hand shadow effects from a human hand or object which overlaps the sensing area in locations other than the point being touched.

It is a further object of the invention to provide a flexible sensing layer incorporating the electrodes and wiring of the invention which can be adhered to the underside of a user panel or lens, having all sensing electrodes on a single layer.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

BRIEF DESCRIPTION OF THE DRAWINGS

For a better understanding of the invention and to show how the same may be carried into effect reference is now made by way of example to the accompanying drawings.

DETAILED DESCRIPTION OF A PREFERRED EMBODIMENT

Figure 1:
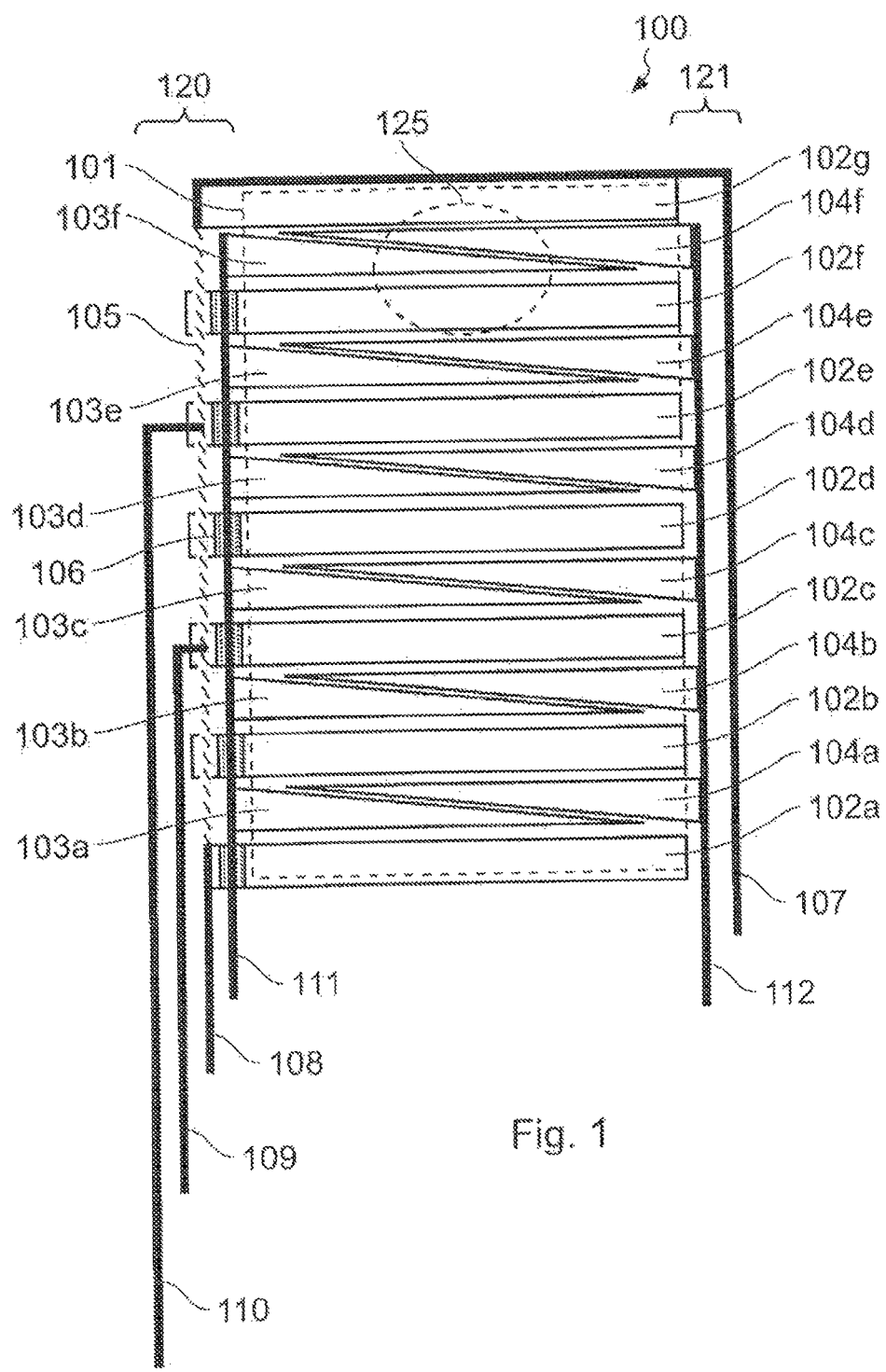
FIG. 1 schematically shows a pattern of the electrodes and wiring according to a first embodiment of the invention.

Referring to the drawings, in FIG. 1 there is shown a first embodiment of the invention. FIG. 1 shows in plan view a capacitive touch sensing array 100 having a usable touch area 101 (shown as a dotted outline). Electrodes 102a-g resolve a first axis (shown as y), while electrodes 103a-f and 104a-f resolve a second axis (shown as x). In practice the configuration is reversible with respect to x and y in some applications. The x axis is resolved by the field gradients produced by the triangular shapes as is known in the art. Left-side and right-side connections 111 and 112 respectively are wired to a circuit (not shown) which senses the capacitive loading on these electrodes and obtains a ratiometric measurement of touch location along the x axis.

The y axis is resolved by the use of a resistive element 105 which runs along one side of the electrodes and which connects to electrodes 102a-g. The field gradient on this axis is produced by 105 in a manner known according to my co-pending U.S. application Ser. No. 10/697,133 (published as US 2004/104826A1 and granted as U.S. Pat. No. 7,148,704). Two principle wiring connections are made to this resistive element, namely top and bottom y-sensing connections 107 and 108 respectively. One or more additional wiring connections are optionally made between end bars 102a and 102g. Shown in FIG. 1 are two such connections, namely a lower middle connection 109 and an upper middle connection 110; the reasons for such connection(s) will shortly be explained, for a total of five, six, or more total possible connections. Resistive element 105 has an end-to-end resistance between 1K ohms and 10M ohms, although optimum performance is achieved with values between 20K and 1M ohms in most practical designs. Element 105 is best fashioned from a resistive film to keep the overall array thin; materials for 105 can include thick film resistors, ITO, conductive polymers, and the like. The film is deposited in a way as to overlay the electrodes 102 in the case of an ITO or metal-based electrode set. In some applications it is also acceptable to use a chain of discrete resistors, for example when space is not a problem.

Crossovers between the left-side wiring trace 111 and the electrodes 102 are resolved by the aid of thin dielectric areas 106 deposited on top of the electrodes 102 prior to depositing the conductor for the left-side connections 111. Since the sensing element 100 usually is wired to a connector or a sensing chip located on one edge, the wires 107, 108, 109, 110, 111, and 112 are led to one edge (shown as bottom) where they can be, wired to a connector or the sensor chip.

One known problem with capacitive touch screens when mounted behind a dielectric, especially one of low epsilon and/or substantial thickness and overall size is the phenomenon of 'hand shadow' described more generally in my U.S. Ser. No. 10/341,948 (published as US2003/132922A1). The problem of hand shadow increases especially when fewer electrode connections are used, as in the present invention. Higher electrode counts and more connections inevitably reduces the effect by localizing the response to the spot of finger touch. However for many applications this is impractical due to the need for narrow wiring channels 120, 121 along the sides of the display area.

The dimensions of the repeating pattern of bars and triangles must be scaled to be equal to or smaller than that of a human finger touch 125. If the pattern scale in the vertical, dimension (as shown) is larger than touch contact area 125, there can be nonlinear cogging of position response as a finger is dragged across the touch surface.

One attribute of hand shadow is that it occurs primarily on the vertical viewing axis as this is the same axis of presentation of a human hand. Therefore, using more than two connections along this axis only can aid in the reduction or practical elimination of hand shadow. Thus one axis should have more connections than the other axis, and the axis with the greater connection count should be the one that suffers most from hand shadow effect, ie the vertical (y) axis. Such a configuration will be referred to as asymmetrically connected electrodes ('ACE').

Accordingly there may be provided middle connections 109 and 110, which assist in localizing the fields on the y axis. It has been experimentally found that these added connections are not required with touch screens of about 2 inches (50 mm) diagonal, but at 3 inches (75 mm) diagonal and greater there is a definite need for hand shadow reduction, especially when the sensing array 100 is located behind plastic, which has a low epsilon causing capacitive fingertip coupling to the electrode array to be reduced. Middle connections 109 and 110 connect at approximately the ⅓ points of the y axis. In various ACE configurations there can be one, two, three or more additional 'middle' electrodes depending on the degree of hand shadow. Generally the longer the y axis, the more middle electrodes are required.

Figure 2:
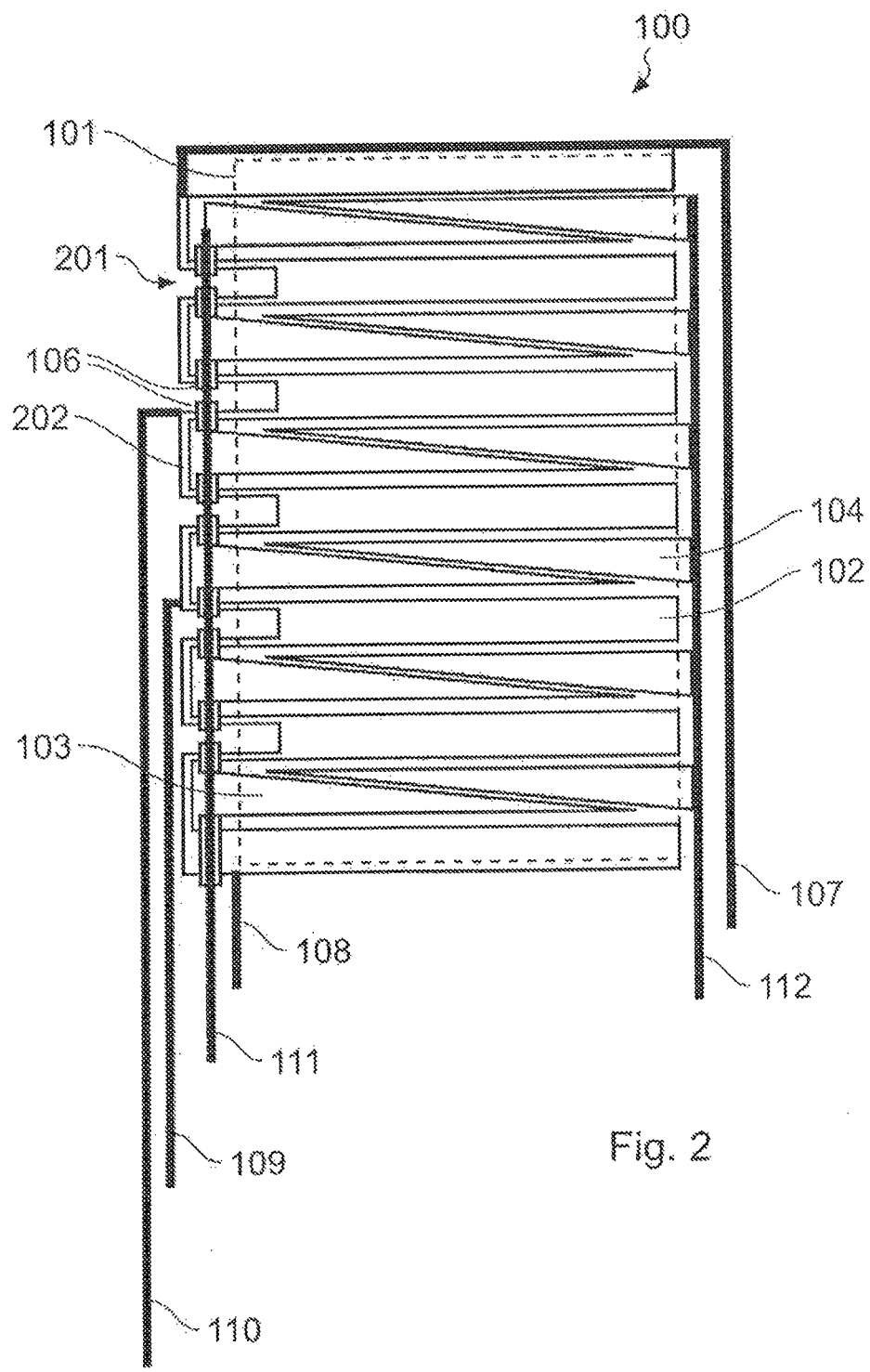
FIG. 2 schematically shows a pattern of the electrodes and wiring according to a second embodiment of the invention, constructed to be more compact.

Turning now to FIG. 2, there is shown a second embodiment with a slightly different configuration of the electrode array 100. In this configuration, the resistive strip 105 is replaced by the same conductive material as used in the electrodes. In the case of ITO, a common value of sheet resistance is 300 ohms per square. In order to use the ITO itself as a resistive element, to achieve the relatively high values of end-to-end resistance required, the path length must be increased in some manner. In FIG. 2 this is achieved by using the bars 102 as an additional path for the current to flow, by means of cutouts 201 within the bars. Bar-to-bar traces 202 are also made of the electrode material so that the entire structure composed of electrodes 102, 103, 104 and traces 202 are made in one step on the same layer. Dielectric 106 separates the electrode conductor from the left x connection 111 to prevent short circuits.

Figure 3:
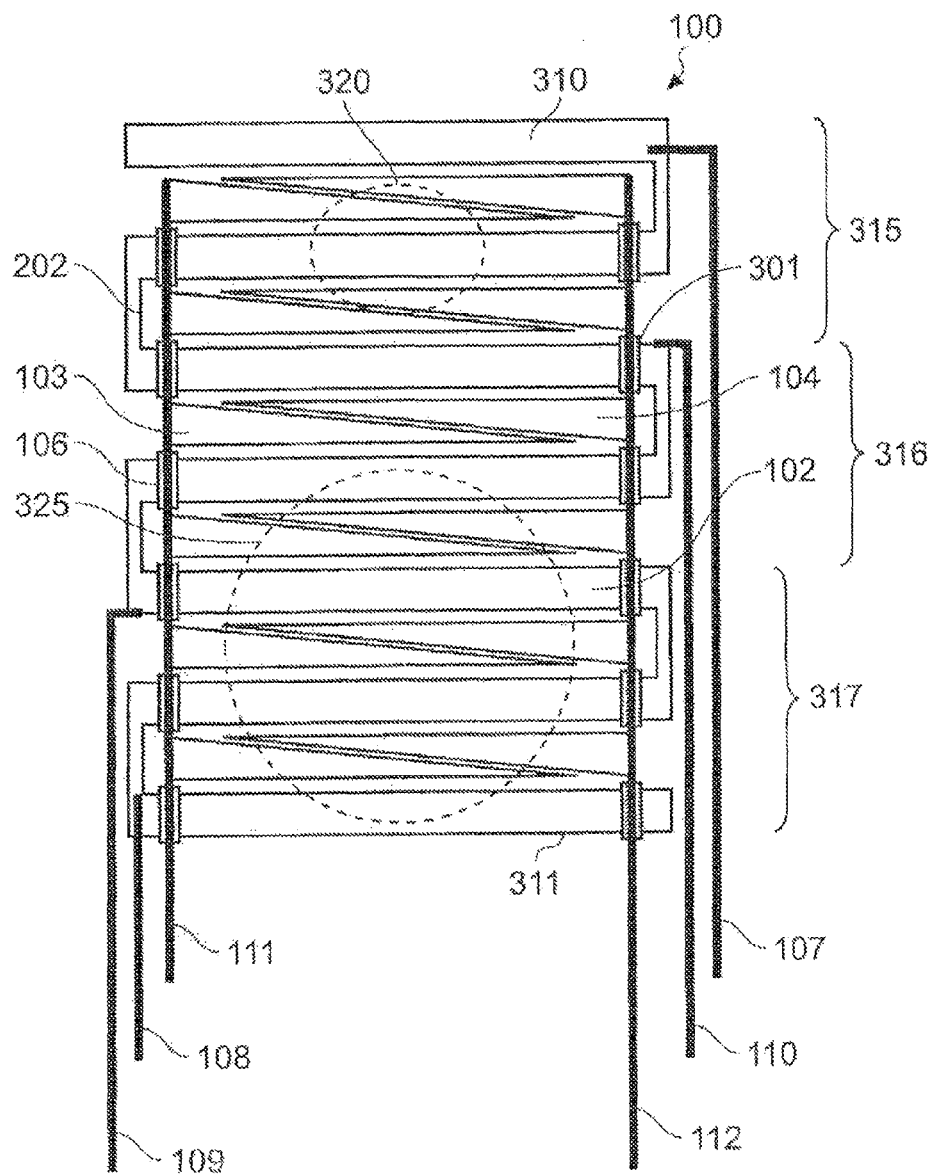
FIG. 3 schematically shows a pattern of the electrodes and wiring according to a third embodiment of the invention, constructed to be more compact and symmetrical. Also shown are areas of touch and hand shadow.

Turning now to FIG. 3, there is shown a third embodiment with yet another configuration of electrode array 100, whereby the required resistive strip shown as 105 in FIG. 1 is incorporated into the y resolving bars 102 themselves. The path for the resistance is serpentine from top to bottom (as shown) with resistive routing 202 connecting each bar to the next. The end bars 310, 311 at the top and bottom of the electrode pattern do not participate in the resistive path; as a result they are equipotential with respect to their connecting wires 107 and 108. Since the right x connection 112 still needs to connect to the right triangles 104, additional thin crossover dielectric 301 is required between each of ones 104 and 112.

Dotted outlines 320 and 325 show the areas of finger contact and hand shadow respectively which will be discussed further below.

Figure 4:
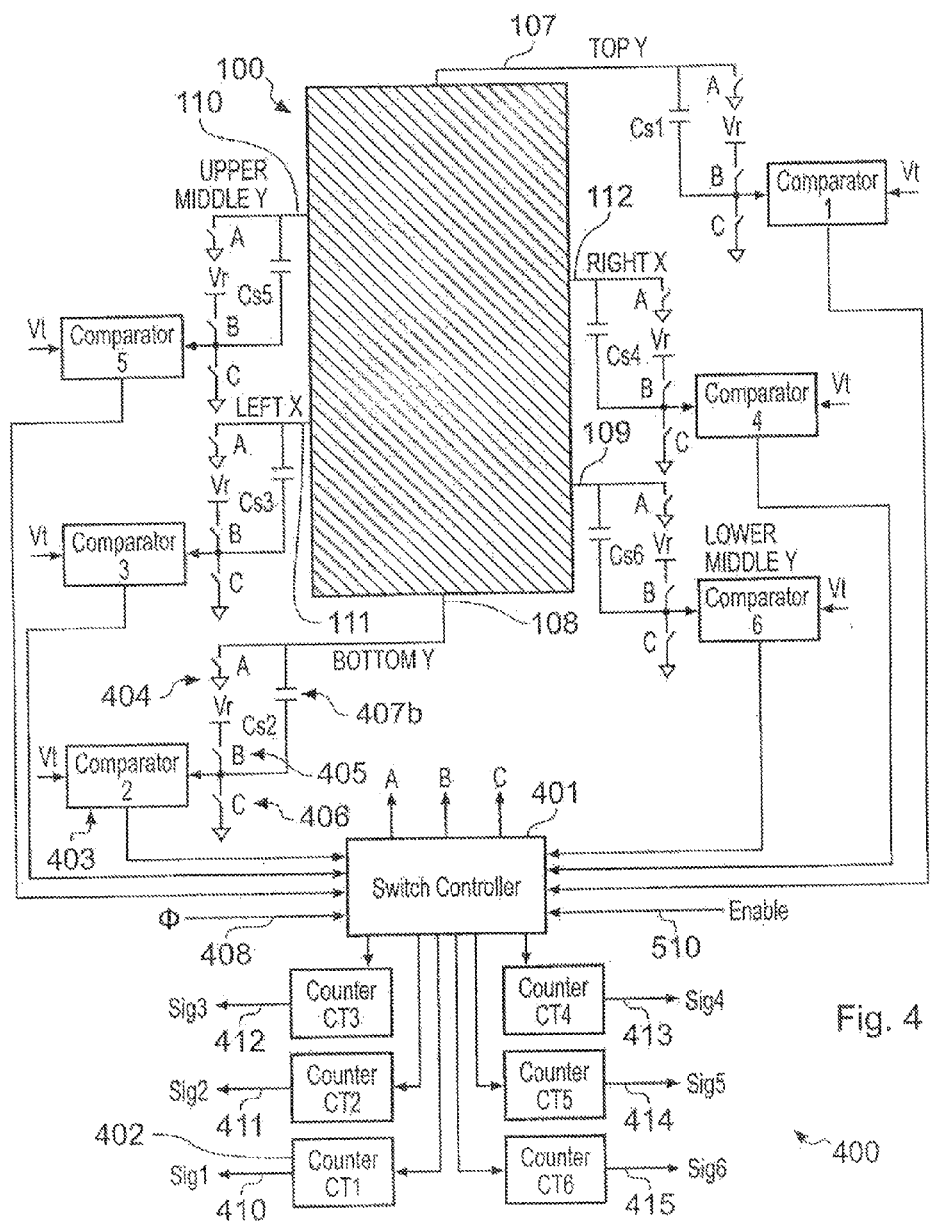
FIG. 4 schematically shows one form of driver circuit which may be conveniently used to drive the electrodes of the invention.

FIG. 4 shows an ACE capable circuit 400 for operating the touch screen electrode set 100. As shown, there are six sensing channels operating by means of single controller 401, which sends switch controls signals A, B, C to each switch set 404, 405 and 406. Voltage comparator 403 is used to determine the point of termination of counting of respective counters 402. Raw signal outputs 410-415 are led to a signal processing block, described below. The circuit operates in accordance with my U.S. Pat. No. 6,466,036. Preferably the entire circuit 400 is contained in a microcontroller operable under firmware control.

Figure 5:
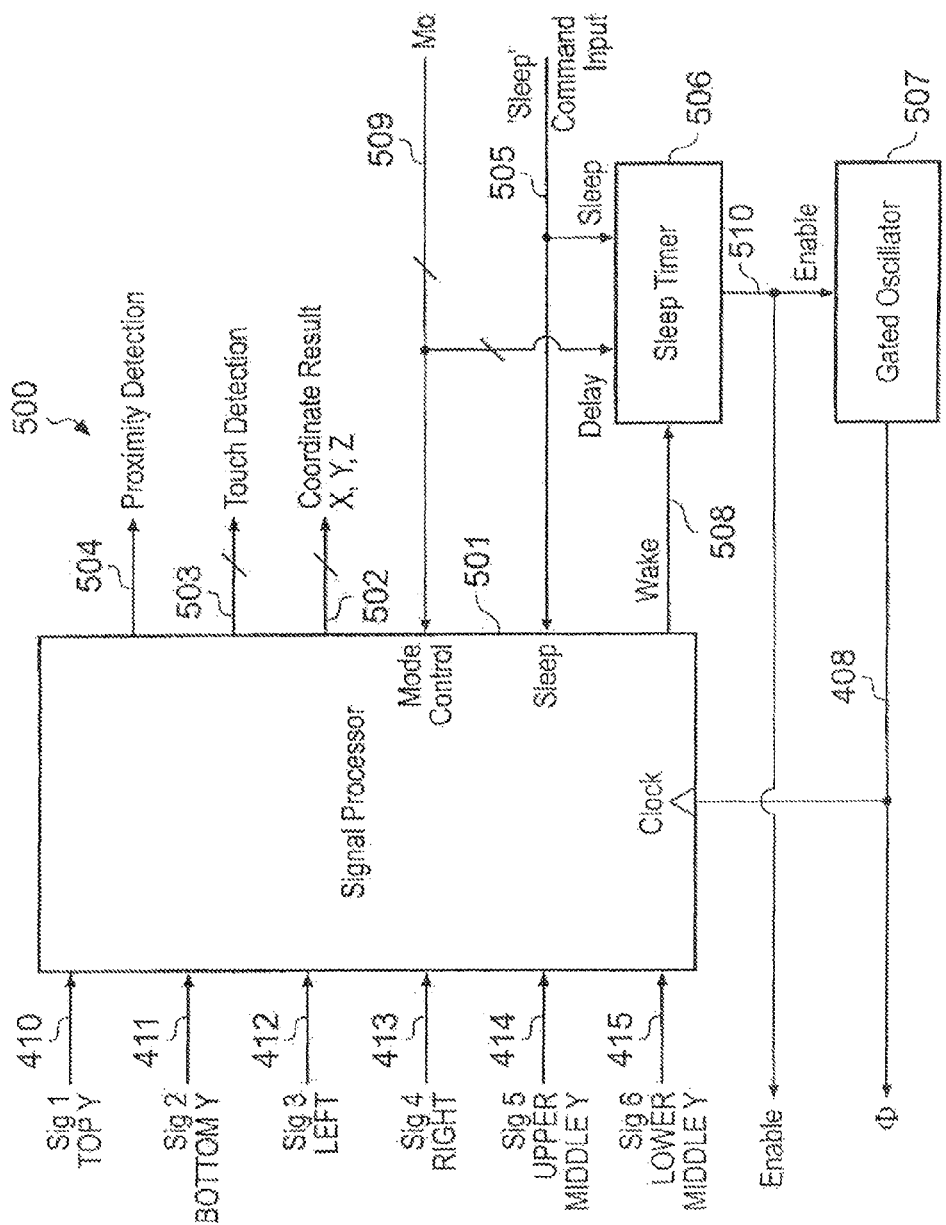
FIG. 5 schematically shows a block diagram of a signal processor such as a microcontroller used to process the signals of the invention.

FIG. 5 shows the signal processing block 501 which is used to process the raw signals 410-415 to a usable result, i.e. at a minimum x and y coordinates plus touch detection logic confirmation signal 503. Additionally, there may be provided a proximity detection logic output 504 which reacts to near proximity of an object such as a human hand. Coordinate outputs 502 may also include a Z axis result which is proportional to signal strength; this can help resolve object proximity and also assist in determining touch pressure.

Signal processing for x and y results is performed according to ratiometric methods as described in numerous other patents including my own U.S. Ser. No. 10/697,133 (published as US 2004/104826A1 and granted as U.S. Pat. No. 7,148,704). Z-axis results such as signal strength, proximity detection and touch detection are simply derived from a change in the sum of the signals from all the sensing channels. If the change in this sum exceeds a first amount, proximity is declared. If the change in this sum exceeds a second, larger amount, touch is declared. If the change in the sum itself is the Z-axis signal result.

Resolving the y axis with an ACE configuration is performed according to either a centroidal calculation or via simple linear interpolation between the electrode connection points as is well known in the art. Other means may also be used. Signal variance due to hand shadow appears primarily when the upper portion of the screen is touched 320 but the palm area of a user's hand hovers over the lower portion creating a capacitive 'shadow' effect 325 which is weaker than coupling at 320. Coupling 325 is a variable error term can cause the reported position of 320 to be offset downwards in unpredictable ways. Accordingly in the y axis computation the signals arriving from the lower electrode connections 108 and 109 must be relatively suppressed when an upper area is touched (and vice versa). Left-side and right-side connections 111 and 112 resolve only the x axis and have very little offset error term due to hand shadow.

Also shown are sleep timer 506 and gated oscillator 507 which are used to allow for reduced power modes and more particularly, 'put to sleep' and 'wake from sleep on touch' modes. A main controller (not shown) can send to processor 501 a mode command to place the device into one or more low power or sleep modes via signaling path 509. The host can also put the entire device to sleep via a sleep command 505. In response to 505, the sleep timer 506 can be set for a particular wake up delay which can also be repetitive. After such a delay 506 can enable gated oscillator 507 with output 408 to start up the entire circuit of FIGS. 4 and 5. Optionally the signal processor 501, on detecting either proximity or touch, can also 'wake' 506 into a faster timer mode, i.e. one with less delay between oscillator enables by means of signal 508. The faster mode can persist for the entire session of proximity or touch, then be placed back into low power intermittent wake mode, or full sleep mode. Mode signal 509 can be used to determine the sleep interval. Control signal 510 along with clock output signal 408 are also led to the switch controller 401 to control the operation of the acquisition logic.

Figure 6:
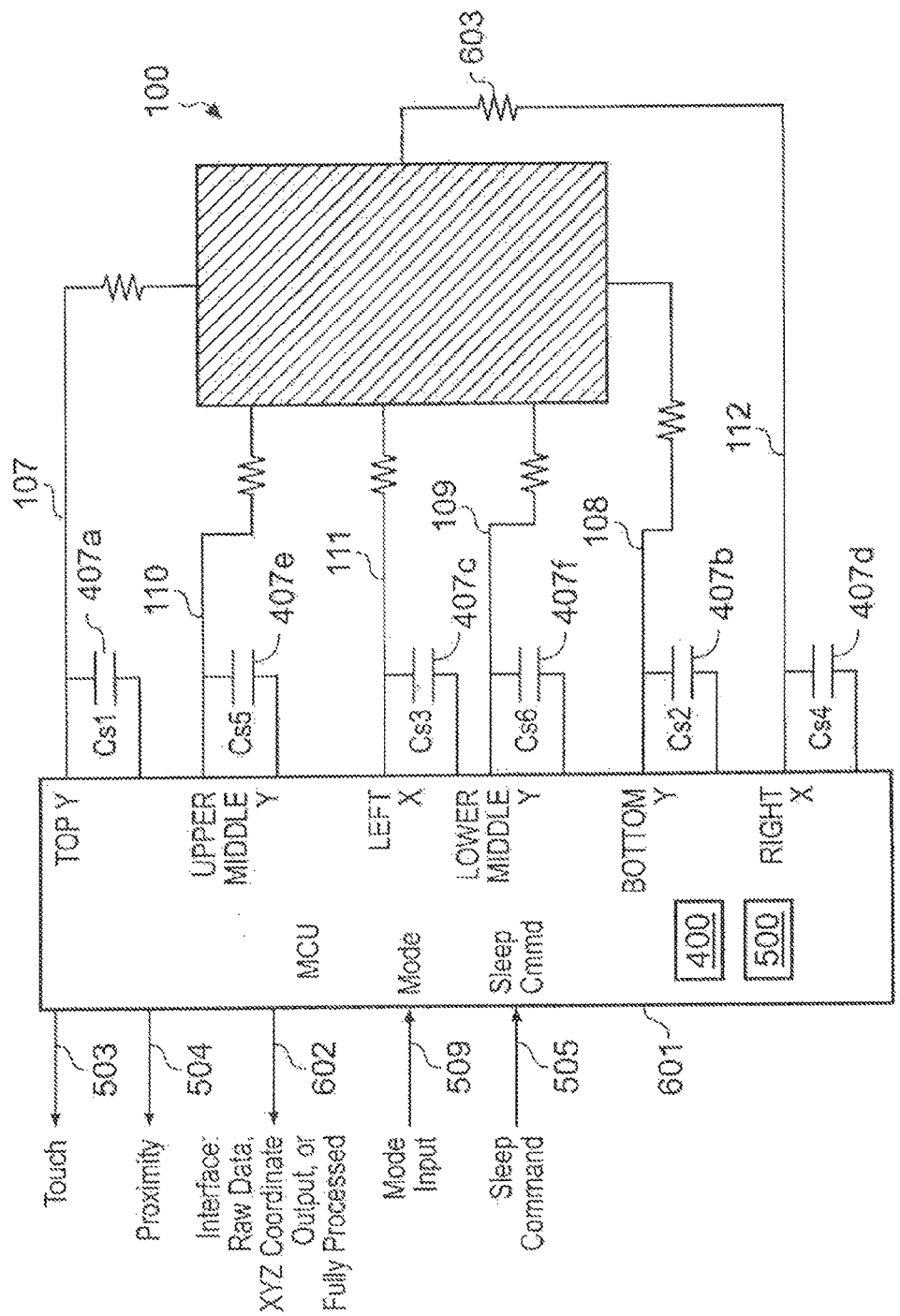
FIG. 6 shows the connections from the electrodes to a microcontroller which implements the circuit of FIG. 5.

In FIG. 6, there is shown a complete actual implementation comprising both FIGS. 4 and 5. The logic of both figures, i.e. 400 and 500, are implemented within a self-contained microcontroller 601 which uses only external acquisition sampling capacitors Cs1 -Cs6, 407a-f and connections to the electrode array 100. Most standard microcontrollers contain within them all the logic necessary to carry out the functions and operations described supra. For ESD suppression and electromagnetic compliance, resistors 603 are used to provide some decoupling from the sensing elements.

The electrode designs shown in FIGS. 1, 2 and 3 can be deposited directly onto the rear of a dielectric panel such as glass. ITO can be used to make the sensing region clear for use over an LCD or other display.

In an alternative embodiment, the triangle electrodes may form an interleaved pattern which may generate field gradients.

Figure 7:
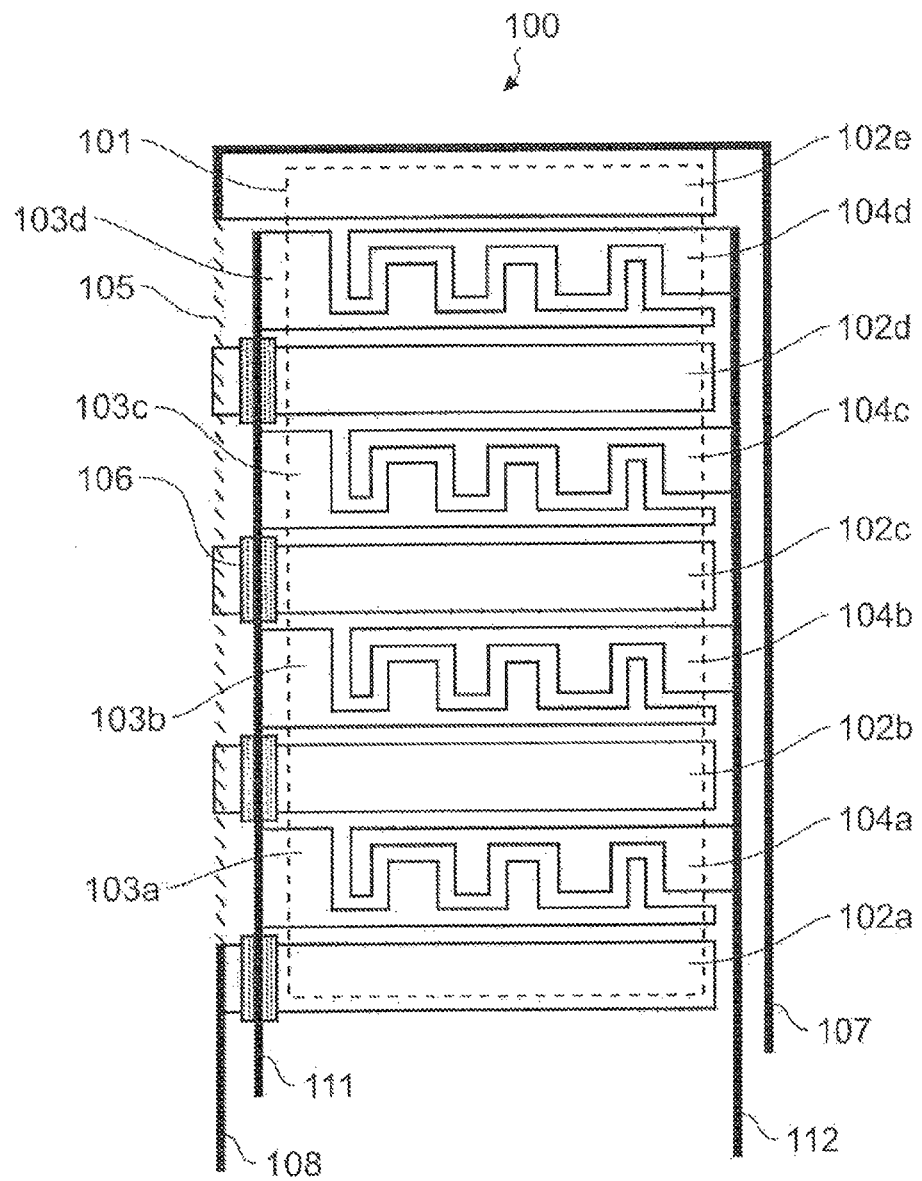
FIG. 7 schematically shows a pattern of the electrodes and wiring according to a fourth embodiment of the invention.

FIG. 7 schematically shows a pattern of the electrodes and wiring according to such an alternative embodiment, which is the fourth embodiment. The features corresponding to those of the previous embodiments are labeled with the same reference numerals. The capacitive touch sensing array 100 with a usable touch area 101 (shown as a dotted outline) is evident. Bar electrodes 102a-e resolve a first axis (shown as y), while electrodes 103a-d and 104a-d resolve a second axis (shown as x). The present embodiment is the same as the first embodiment except for the shape of the ratiometric signal providing electrodes 103a-d and 104a-d. Instead of a smooth triangular tapering to form the regions of co-extension, the x-electrodes have a crenellated shape in which the co-extension between x-electrode groups 103a-d and 104a-d is formed by an interdigitation in the y-direction, whereby adjacent blocks from co-extending electrode pairs have defined ratios of areas specific to the x-position.

The desired x-dependent change in the ratiometric signals derived from the co-extending pairs of x-electrodes is still achieved in view of the area ratios provided in the y-direction through the interdigitated shape provided that the actuation area, e.g. finger contact area, is of an appropriate size. The interdigitated arrangement may be preferable for a sensor area that is principally used for arrays of buttons, since it provides a stepwise change in x-position information corresponding to the width of each interdigitated unit, indicated as 'w' in the figure. In this way, both the x- and y-position information can be given a stepwise sensitivity which is the preferred implementation for a button array.

Similar to the first embodiment left-side and right-side x-sensing connections 111 and 112 are wired to a circuit (not shown) which senses the capacitive loading on these electrodes and obtains a ratiometric measurement of touch location along the x axis. The y axis is resolved by the use of a resistive element 105 which runs along one side of the electrodes and which connects to electrodes 102a-e. The field gradient on this axis is produced by resistive element 105 (shown with the hashed line) as in the first embodiment. Two principal wiring connections are made to this resistive element, namely a connection 107 to the top electrode bar 102e and a connection 108 to the bottom electrode bar 102a. One or more additional wiring connections may optionally made between end bars as in the first embodiment, but are not illustrated in the figure. Resistive element 105 has an end-to-end resistance between 1K ohms and 10M ohms, although optimum performance is achieved with values between 20K and 1M ohms in most practical designs. The left-side x conductor 111 is isolated from the bars 102a-e by thin dielectric areas 106 as in the first embodiment.

It will be appreciated that each electrode may have any desired number of crenellated units, four being illustrated. For a button array application, such as for the keypad of a cell phone or calculator, the number of units may be relatively small as illustrated, for example in the range of three to eight. On the other hand, if quasi-continuous ratiometric sensing is required then the number of crenellations may be relatively large, for example in the range often to fifty. Similarly, the number of bar electrodes for the y-sensing may be relatively small to provide a granular sensing suitable for button arrays, for example in the range of three to eight, or relatively large for quasi-continuous sensitivity in the y-direction, for example ten to fifty. For larger numbers of y-sensing bar electrodes intermediate connections 109 (not shown) may be advantageously provided.

It will be further appreciated that the capacitive touch sensing array of the fourth embodiment can be implemented as described above for the first to third embodiments in relation to FIGS. 4 to 6 which follows the teaching of U.S. Pat. No. 6,466,036. This is a passive capacitive sensing method that relies on measuring the capacitance of a sensing electrode to a system reference potential (earth). A known alternative capacitive sensing method is active sensing based on measuring the capacitive coupling between two electrodes (rather than between a single sensing electrode and a system ground). The principles underlying active capacitive sensing techniques as applied to 2DCTs are described in my U.S. Pat. No. 6,452,514., 5,648,642 (Synaptics, Inc.) also describes active capacitive sensing in a 2DCT.

For the sake of completeness operation of the electrode pattern of the fourth embodiment with active sensing is now described. It will be appreciated that the electrode patterns of the first to third embodiments may also be driven with active sensing in a similar manner. That is to say that the block electrodes 102 and 103 of the fourth embodiment may be exchanged for smoothly tapered electrodes and the above-described options of the first to third embodiments are available for forming the resistive interconnections between the bar electrodes 102.

With reference to FIG. 7, an active sensing circuit will use the bar electrodes 102 as the drive electrodes and the crenellated electrodes 103 and 104 as the sense electrodes. The resistive path interconnecting the bar electrodes 102 will form a voltage divider so that the top bar electrode 102e will be at the rail voltage and the bottom bar electrode 102a at ground, with the intermediate bar electrodes 102b-d at approximately equally spaced intermediate voltages.

The basic principle of active sensing as applied to 2DCTs is that field coupling between a drive and sense electrode pair is attenuated by a finger touch, since the human body conducts away a portion of the field between the drive and sense electrode pair. The charge transferred between the drive and sense electrodes is thus reduced as a result of the touch, and this reduction in charge accumulation at a sampling capacitor is detectable. Returning to the present circuit, with the voltage ladder provided by the resistive path 105, it will be appreciated that the Magnitude in the reduction of accumulated charge at the sample capacitor scales linearly with the drive voltage of the drive electrode. Consequently, the magnitude of the reduction in detected signal is indicative of which electrode bar is being affected by the finger touch. In this way, vertical resolution in the y-direction of the 2DCT is provided. The resistive path 105 in an active sensing implementation thus has a different role from in the passive sensing implementation. In the former case, it acts as a voltage divider, whereas in the latter case it serves as a current path.

For the horizontal resolution in the x-direction, the mechanism is conceptually similar to the passive sensing implementation in that there is a ratiometric analysis performed between the relative signal strength obtained by paired ones of the electrodes 103 and 104, i.e. between 103a and 104a, 103b and 104b, and so forth. This is because the magnitude of the attenuation of charge transfer will, scale with the relative areas of paired sense electrodes 103 and 104 that lie under the finger contact.

Figure 8:
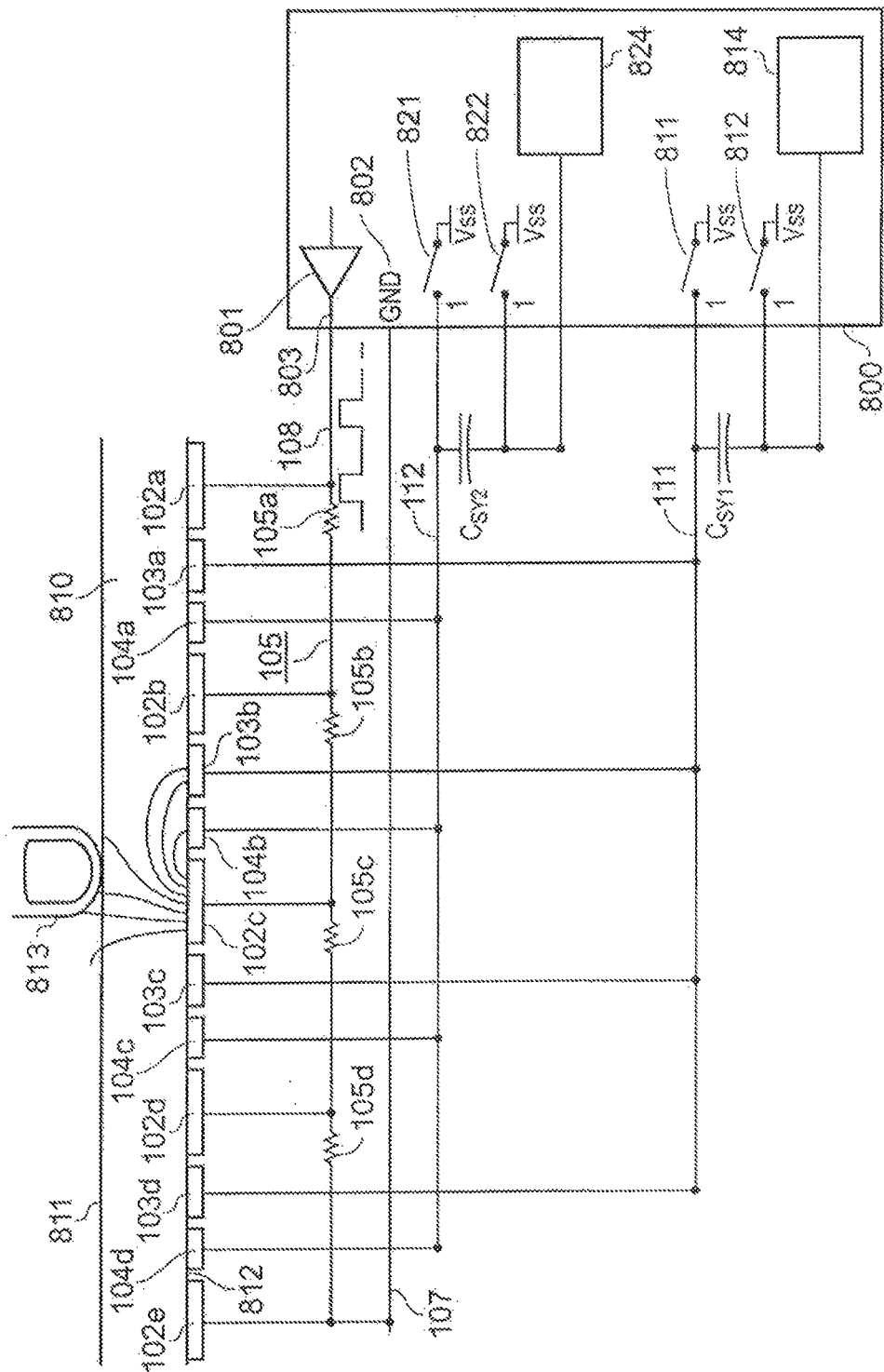
FIG. 8 shows an active sensing circuit for use with the electrode pattern and wiring arrangement of the fourth embodiment of FIG. 7, or indeed any of the first to third embodiments.

FIG. 8 shows an active sensing circuit for use with the electrode pattern and wiring arrangement of the fourth embodiment of FIG. 7, or indeed any of the first to third embodiments. The upper part of the figure is schematic vertical section through the touch panel on the left side of the panel where the electrodes 103 extend further in the vertical direction than the electrodes 104. The touch panel is formed of a dielectric panel 810 having an upper surface 811 for touching by a finger 813 and a lower surface 812 on which the electrode pattern and contacts are arranged in a conventional manner. The dielectric panel may be made from any suitable material, such as glass, for example pyrex glass, mylar, teflon or a plastics compound, as is known in the art. Suitable plastics compounds comprise, but are not limited to: polyvinyl chloride (PVC), polycarbonate, polystyrene, polypropylene, polyethylene, cycloolefin co-polyer (as sold under the trade names Zeonex™, Zeonor™, Topas™, Apel™ and Artron™ by various vendors), Styrene-acrylonitrile copolymer (SAN), polyimide, polyimide, and polymethylmethacrylate (PMMA).

The lower and right part of the figure illustrate schematically a control circuit with suitable interconnects and discrete components. Such a control circuit is provided by a conventional integrated circuit 800, such as the QMatrix™ microcontroller chip operated under firmware control, which is available from QRG Limited.

Electrodes 102a-e, 103a-d and 104a-d known from FIG. 7 are arranged on the lower panel surface 812. Electrodes 102 are the drive electrodes for what is referred to as the drive channel, or X channel, and are supplied though connection 108 with drive pulses (shown schematically) from a pin 803 of the control chip 800 through a suitable drive buffer 801 internal to the chip. The resistive path 105 interconnecting the drive electrodes 102a-e is illustrated as including discrete resistors 105a-d interposed between adjacent ones of the drive electrodes. This is a farther design option available to any of the above described embodiments. These provide the required voltage dividing function described above. A return path is required for the drive signal and this is provided by line 107 which is connected to a ground (earth) pin 802 on the chip 800.

The two groups of sensing electrodes 103 and 104 for what is referred to as the Y1 and Y2 sense channels are each commonly connected to lines 111 and 112 respectively. Each of these lines carries charge to be transferred from the panel to respective sampling capacitors. Sampling capacitor CSY1 accumulates charge on the Y1 channel conveyed by wire 111. Sampling capacitor CSY2 accumulates charge on the Y2 channel conveyed by wire 112. Two independent and identical sensing circuits are provided for the two sensing channels. These are conventional in design and follow the principles disclosed in my U.S. Pat. No. 6,452,514, the content of which is incorporated herein by reference. The sampling capacitor CSY1 is straddled by two switches 811 and 812 which, with suitable actuation, can be used to reset the sample capacitor prior to measurement and to read-out charge accumulated in the sample capacitor to a suitable measurement circuit 814, such as an A/D converter, amplifier or other suitable circuit elements that capture a voltage level indicative of signal strength for the Y1 channel. The Y2 channel circuitry is exactly the same with sample capacitor CSY2, switches 821 and 822, and measurement circuit 824. The data acquired by the measurement circuits 814 and 824 is then combined by numerical processing in order to perform the ratiometric analysis required to obtain the position information in the vertical and horizontal directions. This analysis function may be incorporated in the integrated circuit 800 or performed externally. As mentioned above, the integrated circuit may be embodied in a QMatrix chip available from QRG Limited. The operating principles of the QMatrix chip are described in U.S. Pat. No. 6,452,514, the content of which is incorporated herein by reference, in particular in relation to detailed information regarding the switching arrangements and their drive sequences that can be used to read out signal from the sample capacitors.

It will be appreciated that although the drive and sense electrodes are shown illustrated directly adjacent to the dielectric panel 810, typically they will be supported on a common substrate such as a thin flexible sheet of a suitable plastics material that can be affixed to the lower surface 812 of the dielectric panel 810 by suitable means, such as adhesive bonding or with fasteners.

Referring to FIG. 8 it is evident that the active sensing implementation provides a very low pin count, since all the drive electrodes are commonly driven from only two pins 802, 803 of the control chip, and the two sets of sense electrodes are each commonly connected to a respective sense channel.

In summary, described herein is a capacitive touch screen or mouse trackpad sensing element using separated x and y resolving elements which are isolated from each other galvanically, so that each can be resolved independently of the other in order to simplify the connections and signal processing.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

The invention claimed is:

1. A touch sensor comprising:
 a plurality of first electrodes, each extending in a first direction;
 a resistive voltage divider directly coupled to each of the first electrodes and extending in a second direction, the resistive voltage divider configured to provide a stepwise progression in voltage reduction between a first one of the first electrodes and each succeeding first electrode along the second direction to provide second direction touch position information; and
 a plurality of pairs of second and third electrodes, each pair being disposed between adjacent first electrodes, wherein the electrical coupling of the second electrodes or the electrical coupling of the third electrodes are separated from the first electrodes by dielectric areas deposited on the first electrodes, and wherein the second electrodes are electrically coupled to each other and the third electrodes are electrically coupled to each other to provide first direction touch position information.

2. The touch sensor of claim 1, wherein the second and third electrodes each have a triangular shape.

3. The touch sensor of claim 1, wherein each pair of second and third electrodes co-extend into each other in the first direction with interdigitation in the second direction.

4. The touch sensor of claim 1, wherein each of the second and third electrodes has a crenellated shape.

5. The touch sensor of claim 1, wherein:
 the first electrodes comprise drive electrodes; and
 the second and third electrodes comprise sense electrodes.

6. The touch sensor of claim 1, wherein the resistive voltage divider is incorporated into at least one of the plurality of first electrodes and comprises a portion extending in the second direction that interconnects with an adjacent first electrode.

7. The touch sensor of claim 1, wherein the resistive voltage divider extends into a cutout of at least one of the plurality of first electrodes, the cutout of an electrode comprising an opening at one of the electrode where electrode material has been removed.

8. The touch sensor of claim 1, further comprising:
 a connector coupled to the first one of the first electrodes; and
 a connector coupled to a last one of the first electrodes.

9. The touch sensor of claim 8, further comprising at least one additional connector coupled to one of the first electrodes between the first one and the last one of the first electrodes.

10. The touch sensor of claim 1, wherein the resistive voltage divider and the first electrodes are formed in a single layer of material.

11. A device, comprising:
 a touch sensor comprising:
  a plurality of first electrodes, each extending in a first direction;
  a resistive voltage divider directly coupled to each of the first electrodes and extending in a second direction, the resistive voltage divider configured to provide a stepwise progression in voltage reduction between a first one of the first electrodes and each succeeding first electrode along the second direction to provide second direction touch position information; and
  a plurality of pairs of second and third electrodes, each pair being disposed between adjacent first electrodes, wherein the second electrodes are electrically coupled to each other and the third electrodes are electrically coupled to each other to provide first direction touch position information;
 a controller coupled to the touch sensor and operable to control the touch sensor;
 a first connector coupled to a first one of the first electrodes;
 a second connector coupled to a last one of the first electrodes; and
 at least one additional connector coupled to one of the first electrodes between the first one and the last one of the first electrodes.

12. The device of claim 11, wherein the second and third electrodes each have a triangular shape.

13. The device of claim 11, wherein each pair of second and third electrodes co-extend into each other in the first direction with interdigitation in the second direction.

14. The device of claim 11, wherein each of the second and third electrodes has a crenellated shape.

15. The device of claim 11, wherein:
 the first electrodes comprise drive electrodes; and
 the second and third electrodes comprise sense electrodes.

16. A device, comprising:
 a touch sensor comprising:
  a plurality of first electrodes, each extending in a first direction;
  a resistive voltage divider that is directly coupled to each of the first electrode and extends in a second direction, the resistive voltage divider configured to provide a stepwise progression in voltage reduction between a first one of the first electrodes and each succeeding first electrode along the second direction to provide second direction touch position information; and
  a plurality of pairs of second and third electrodes, each pair being disposed between adjacent first electrodes, wherein the electrical coupling of the second electrodes or the electrical coupling of the third electrodes are separated from the first electrodes by dielectric areas deposited on the first electrodes, and wherein the second electrodes are electrically coupled to each other and the third electrodes are electrically coupled to each other to provide first direction touch position information; and a controller coupled to the touch sensor and operable to control the touch sensor.

17. The touch sensor of claim 1, wherein each intermediate first electrode is coupled to adjacent first electrodes at alternating ends of the each intermediate first electrode using resistive routing.

18. The device of claim 16, further comprising a display coupled with the touch sensor.

19. The device of claim 16, wherein the second and third electrodes each have a triangular shape.

20. The device of claim 16, wherein each pair of second and third electrodes co-extend into each other in the first direction with interdigitation in the second direction.

21. The device of claim 16, wherein each of the second and third electrodes has a crenellated shape.

22. The device of claim 16, wherein:
the first electrodes comprise drive electrodes; and
the second and third electrodes comprise sense electrodes.

23. The device of claim 16, wherein the resistive voltage divider is incorporated into at least one of the plurality of first electrodes and comprises a portion extending in the second direction that interconnects with an adjacent first electrode.

24. The device of claim 16, wherein the resistive voltage divider extends into a cutout of at least one of the plurality of first electrodes, the cutout of an electrode comprising an opening at one of the electrode where electrode material has been removed.

25. The device of claim 16, further comprising:
a connector coupled to a first one of the first electrodes;
a connector coupled to a last one of the first electrodes; and
at least one additional connector coupled to one of the first electrodes between the first one and the last one of the first electrodes.

* * * * *